United States Patent [19]

Hashimoto

[11] Patent Number: 4,856,053
[45] Date of Patent: Aug. 8, 1989

[54] TELEPHONE TERMINAL EQUIPMENT HAVING MEANS FOR PREVENTING MALICIOUS AND NUISANCE TRANSMISSION

[75] Inventor: Kazuo Hashimoto, Tokyo, Japan

[73] Assignee: Hashimoto Corporation, Tokyo, Japan

[21] Appl. No.: 187,940

[22] Filed: Apr. 29, 1988

[30] Foreign Application Priority Data

May 6, 1987 [JP] Japan .................. 62-109987

[51] Int. Cl.⁴ .................. H04N 1/00; H04N 1/32
[52] U.S. Cl. .................. 379/96; 379/100; 358/434
[58] Field of Search .................. 379/93, 95, 96, 97, 379/98, 100; 358/257

[56] References Cited

FOREIGN PATENT DOCUMENTS 0236562  11/1985  Japan .................. 379/95
0082558  4/1986  Japan .................. 379/100
0112466  5/1987  Japan .

*Primary Examiner*—Jin F. Ng
*Assistant Examiner*—Bonita Lewis
*Attorney, Agent, or Firm*—Lowe, Price, LeBlanc, Becker & Shur

[57] ABSTRACT

Telephone terminal equipment has circuitry for preventing malicious and nuisance transmission of information by detecting during reception of an incoming call whether or not any person is present around the equipment. Information from a calling party is received without any limit when no person is around the equipment. An owner can remotely operate the equipment to set the limited number of paper or to release the limit for receiving information as he desires.

7 Claims, 1 Drawing Sheet

TELEPHONE TERMINAL EQUIPMENT HAVING MEANS FOR PREVENTING MALICIOUS AND NUISANCE TRANSMISSION

BACKGROUND OF THE INVENTION

The present invention relates to telephone terminal equipment such as a facsimile, telex or the like.

In conventional telephone terminal equipment such as a facsimile or the like, lengths of roll paper for receiving information from a calling party are successively supplied by a supplying mechanism so long as the calling party is transmitting the information to said equipment. The information is received so long as there is any length of roll paper. Then, even if the calling party continues to send useless information endlessly for a malicious purpose, said information must be received until all the receiving roll paper is used up.

SUMMARY OF THE INVENTION

It is the object of the present invention to limit the information to be received from a calling party by telephone terminal equipment, in order to prevent malicious transmission of useless information.

The above and other objects, features and advantages of the present invention will become more apparent from the following description when taken in conjunction with the accompanying drawing in which a preferred embodiment of the present invention are shown by way of illustrative example.

BRIEF DESCRIPTION OF THE DRAWINGS

The FIGURE is a circuit block diagram explaining the principle of this invention.

BEST MODE FOR PRACTICING THE INVENTION

Figure 1:
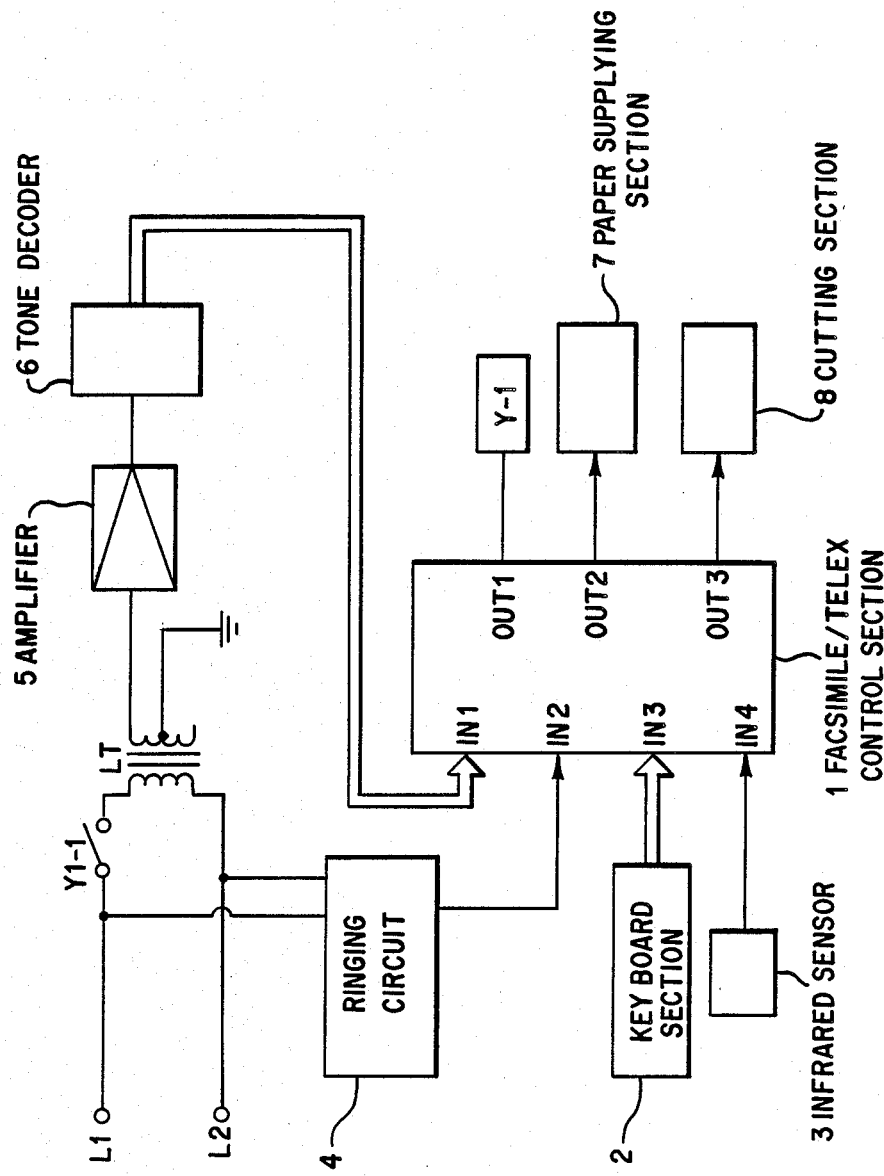

In the FIG. 1, 1 denotes a facsimile/telex control section for controlling a facsimile (this equipment), and the facsimile control section 1 is mainly made of a microprocessor (central processing unit CPU). 2 denotes a key board section having a starting button for the facsimile, a key for a telephone set which is not shown in the FIGURE, and a key for restricting number of receiving sheets of facsimile information which are transmitted from the caller, etc. 3 denotes an infrared sensor. When someone is around the facsimile, the infrared sensor detects infrared rays which are emitted from a human body, and outputs a signal having a specific level. 4 denotes a ringing circuit for detecting a calling signal. 5 denotes an amplifier for a remote control signal. 6 denotes a tone decoder for decoding a DTMF tone of a pushphone which is transmitted as the remote control signal. 7 denotes a paper supplying section for papers which record the facsimile information transmitted from the caller. 8 denotes a cutting section for cutting paper sheets. Y-1 denotes a relay for closing operated by the calling signal, and has a point of contact Y1-1.

Operation of the invention is explained as follows. The infrared sensor 3 is always kept in an operating condition, outputting to an input terminal IN4 of the facsimile control section 1, and this output is read out by a program set in the facsimile control section 1, when it is needed. The number of sheets which can be received when an operator is absent, is previously registered by the fixed key operation on the key board 2. When the number of sheets is not registered, the number of sheets is set to 2 sheets as a default.

When a signal is received in this condition, the calling signal is detected by the ringing circuit 4. The output of circuit 4 is detected by the program through the input terminal IN2 on the facsimile control section 1. As a result, the relay Y-1 is kept in an operating condition by an output from the output terminal OUT1. At this time, the telephone line L1 and L2 are closed by the point of contact Y1-1 in the relay Y-1. As a result, a calling signal stops and the telephone is set to a talking mode of operation over the telephone.

At the same time, an outgoing message or a specific tone generated by a speech synthesis section (not shown) is output from the facsimile side of this equipment (the facsimile for receiving). An output from the infrared sensor 3 is read out continuously. After the outgoing message or the tone is heard, the facsimile for calling is operated, and sending sheets starts.

When the facsimile for receiving receives data of the transmitted sheets, the paper supplying section 7 is operated by the output from the output terminal OUT2 on the facsimile control section 1. As a result, paper (not shown) is supplied, and a circuit (not shown) starts to record received data on the paper, and each sheet of paper is cut by the cutting section 8. This operation is repeated with reference to the output from the infrared sensor 3. When the infrared sensor 3 outputs a signal indicating that there is nobody around the facsimile, the number of papers is restricted to the number registered previously. And when recording reaches the number registered previously, after supplying paper stops, the relay Y-1 is set to OFF, the closed telephone line opens, and the facsimile for receiving is restored to a waiting condition for the next receiving.

When the infrared sensor 3 detects an existence of human beings when a signal is received, all the data on the sheets transmitted from the facsimile for calling are on paper without any restriction in accordance with the output from the infrared sensor 3.

The facsimile of this equipment can register many identification codes (ID codes) by the keyboard 2. When the identification code (ID code) is transmitted as a signal is received, the identification code (ID code) is compared with many identification codes which are registered previously in this equipment. When the infrared sensor 3 outputs the signal indicating that there is nobody around the facsimile, if the transmitted identification code coincides with the identification code registered previously, namely, even if the number of receiving sheets is restricted, the restriction of the number of receiving sheets is released when both the identification codes coincide. All the data on the sheets transmitted from the facsimile for calling can be recorded on the paper. The facsimile of this equipment can set at will the number of receiving sheets by remote control from a pushphone at outside by the owner.

In order to set the number of receiving sheets by remote control, the owner calls the facsimile of this equipment by using the pushbutton telephone from outside. When the owner hears the outgoing message or the tone, the owner sends a special code for setting the number of receiving sheets, for example "#9⇌" in order, using the pushbutton telephone. After this code is changed to the binary code number system by the tone decoder 6 through the line transformer LT and the amplifier 5, the changed code is input to the input terminal IN1 on the facsimile control section 1. And when this code is detected by the program, the facsimile of this equipment is changed to a registration mode for the number of receiving sheets. The change to the registration mode for the number of receiving sheets is reported by a speech synthesis or a tone (not shown in the FIGURE). Thereafter, the owner sends data of registration number by operating the ten keys on the pushphone. As a result, the number is received by the facsimile, and is registered, and the facsimile of this equipment is restored.

This application explains about the facsimile as a practicing example; however, it is possible to apply the invention to various other telephone terminal equipment. Accordingly, the practical scope of the invention is broad. As above, this invention improves the conventional facsimile which receives all the information when information from a calling party is transmitted successively. Namely, this invention limits information from a calling party, and is effective against a malicious and nuisance transmission.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. Telephone terminal equipment having means for preventing malicious and nuisance transmission to a data reception apparatus, comprising:
   a paper roll containing papers on which incoming data to the equipment are recorded;
   sensor means for detecting whether or not any person is present around said telephone terminal equipment during reception of an incoming call at said equipment;
   means responsive to said sensor means for receiving information sent by a calling party during the incoming call without any limit on the number of papers onto which said data are recorded when any person is present around said telephone terminal equipment;
   limit means responsive to said sensing means for limiting the number of papers onto which said data are recorded during the incoming call when no person is present around said telephone terminal equipment; and
   means for adjusting variably said limit means in response to a control signal sent to the equipment by telephone from a remote location.

2. A telephone terminal equipment having means for preventing malicious and nuisance transmission, according to claim 1, wherein said equipment includes not only roll paper but also another recording medium such as a data storage disk.

3. A telephone terminal equipment having means for preventing malicious and nuisance transmission, according to claim 1, wherein said equipment includes a facsimile machine.

4. A telephone terminal equipment having means for preventing malicious and nuisance transmission, according to claim 1, wherein said equipment includes a telex machine.

5. Telephone terminal equipment having means for preventing malicious and nuisance transmission to a data reception apparatus, comprising;
   a paper roll containing papers onto which incoming data to the equipment are recorded;
   sensor means for detecting whether or not any person is present around said telephone terminal equipment during reception of an incoming call at said equipment;
   means responsive to said sensor means for receiving information sent by a calling party during the incoming call without any limit on the number of papers onto which said data are recorded when any person is present around said telephone terminal equipment;
   limit means responsive to said sensor means for limiting the number of papers onto which the data are recorded when no person is present around said telephone terminal equipment; and
   means for releasing said limit means in response to a control operation sent to the equipment by telephone from a remote location.

6. A telephone terminal equipment having means for preventing malicious and nuisance transmission, according to claim 5, wherein said equipment includes a facsimile machine.

7. A telephone terminal equipment having means for preventing malicious and nuisance transmission, according to claim 5, wherein said equipment includes a telex machine.

* * * * *

UNITED STATES PATENT AND TRADEMARK OFFICE
CERTIFICATE OF CORRECTION

PATENT NO. : 4,856,053

DATED : August 8, 1989

INVENTOR(S) : Kazuo HASHIMOTO

It is certified that error appears in the above-identified patent and that said Letters Patent is hereby corrected as shown below:

In the Abstract, line 6, change "when no person" to --when any person--.

Signed and Sealed this

Eleventh Day of September, 1990

Attest:

HARRY F. MANBECK, JR.

*Attesting Officer*          *Commissioner of Patents and Trademarks*